(12) United States Patent
Ye

(10) Patent No.: US 9,020,561 B2
(45) Date of Patent: Apr. 28, 2015

(54) CONTROL SYSTEM INTERCONNECTING CONNECTION DEVICE AND CELLULAR PHONE FOR CONNECTING TO DISPLAY DEVICE OVER THE INTERNET

(71) Applicant: Feng-Yu Ye, Miaoli (TW)

(72) Inventor: Feng-Yu Ye, Miaoli (TW)

( * ) Notice: Subject to any disclaimer, the term of this patent is extended or adjusted under 35 U.S.C. 154(b) by 95 days.

(21) Appl. No.: 13/964,100

(22) Filed: Aug. 11, 2013

(65) Prior Publication Data

US 2014/0162724 A1 Jun. 12, 2014

(30) Foreign Application Priority Data

Dec. 7, 2012 (TW) .............................. 101223723 U

(51) Int. Cl.
*H04W 88/02* (2009.01)
*H04B 1/38* (2006.01)
*H04M 1/725* (2006.01)
*H04M 1/04* (2006.01)

(52) U.S. Cl.
CPC ................ *H04W 88/02* (2013.01); *H04M 1/04* (2013.01); *H04M 1/72527* (2013.01); *H04M 2250/06* (2013.01)

(58) Field of Classification Search
CPC .......................... H04W 88/12; H04M 1/72533
USPC .............. 455/557, 559, 566, 573, 67.11, 515, 455/422.1, 414.1, 420; 726/17
See application file for complete search history.

(56) References Cited

U.S. PATENT DOCUMENTS

| | | | |
|---|---|---|---|
| 2007/0174876 A1* | 7/2007 | Maggio et al. | 725/78 |
| 2007/0207860 A1* | 9/2007 | Yamauchi et al. | 463/42 |
| 2013/0067564 A1* | 3/2013 | Fok Ah Chuen et al. | 726/17 |
| 2014/0250300 A1* | 9/2014 | Runkis et al. | 713/165 |

* cited by examiner

*Primary Examiner* — John J Lee

(57) ABSTRACT

A control system is provided with a cloud storage including a plurality of corporate servers, a plurality of download sites, and a plurality of online stores; a plurality of base stations connected to the cloud storage and connected to a control device over the Internet respectively; a control device including a charging socket and a HDTV port; a display device including a HDTV port; and a connection member for interconnecting the control device and the display device. The charging socket is adapted to charge a device capable of connecting to the Internet (e.g., smartphone) or a cellular phone.

4 Claims, 1 Drawing Sheet

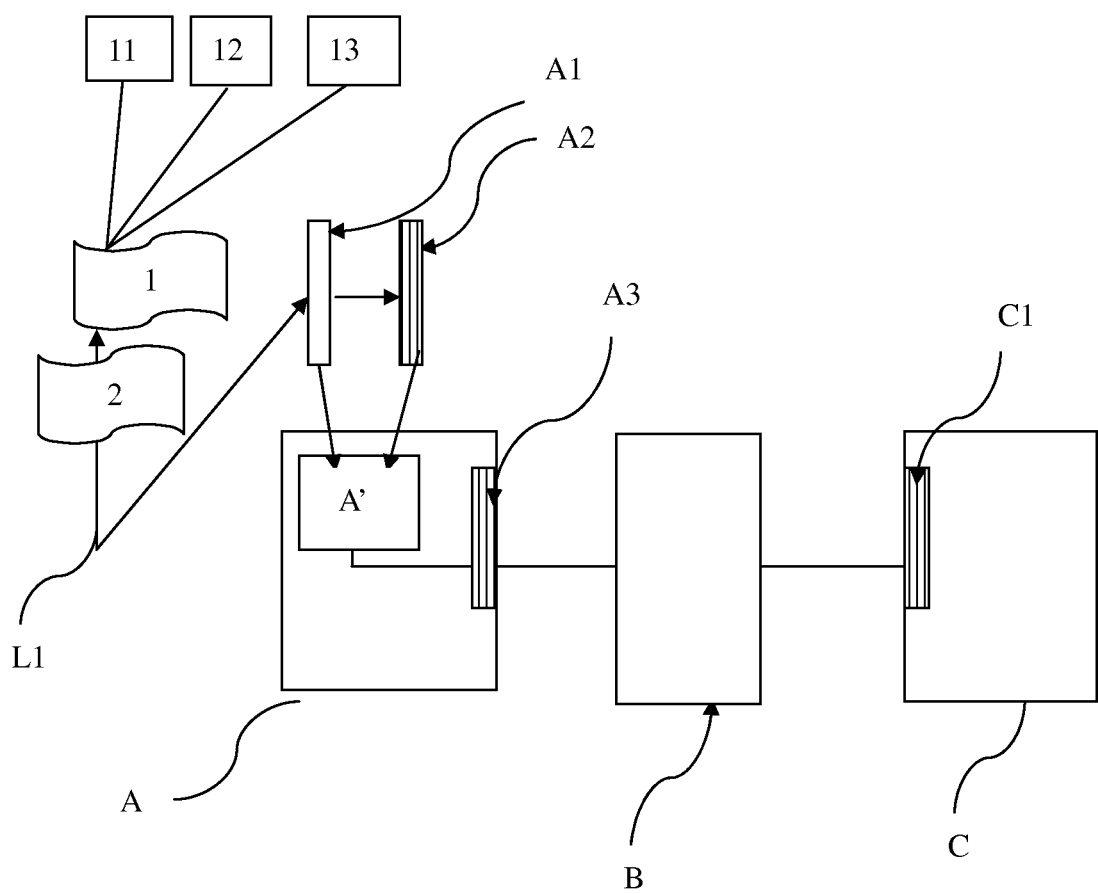

CONTROL SYSTEM INTERCONNECTING CONNECTION DEVICE AND CELLULAR PHONE FOR CONNECTING TO DISPLAY DEVICE OVER THE INTERNET

BACKGROUND OF THE INVENTION

1. Field of the Invention

The invention relates to the Internet and more particularly to a control system interconnecting a connection device and a cellular phone for connecting to a display device over the Internet.

2. Description of Related Art

Cellular phone is a device that can make and receive telephone calls over a radio link while moving around a wide geographic area. It does so by connecting to a cellular network.

In addition to telephony, cellular phones also support a wide variety of other services such as Internet access.

The invention described below is directed to technology of combining cellular phone and the Internet.

SUMMARY OF THE INVENTION

It is therefore one object of the invention to provide a control system comprising, in combination a cloud storage comprising a plurality of corporate servers, a plurality of download sites, and a plurality of online stores; a plurality of base stations connected to the cloud storage and connected to a control device over the Internet respectively; a control device comprising a charging socket and a high-definition television (HDTV) port; a display device comprising a HDTV port; and connection means for interconnecting the control device and the display device; wherein the charging socket is adapted to charge either a device capable of connecting to the Internet or a cellular phone.

The above and other objects and features of the invention will become apparent from the following detailed description taken with the accompanying drawings.

BRIEF DESCRIPTION OF THE DRAWINGS

FIG. 1 schematically depicts a control system interconnecting connection device and cellular phone for connecting to display device over the Internet according to the invention.

DETAILED DESCRIPTION OF THE INVENTION

Referring to FIG. 1, a control system interconnecting a connection device and a cellular phone for connecting to a display device over the Internet in accordance with the invention comprises the following components as discussed in detail below.

A cloud storage 1 is comprised of a plurality of corporate servers 11, a plurality of download sites 12, and a plurality of online stores 13 and connected to a plurality of base stations 2. The base stations 2 are connected to a control device A via a link L over the Internet. The control device A and a display device C are interconnected by a connection device (e.g., high-definition television (HDTV) cable) B.

The control device A comprises a charging socket A' and a HDTV port A3 connected to the charging socket A'. The display device C comprises a HDTV port C1.

Device capable of connecting to the Internet A1 is implemented as a smartphone, an intelligent MP3 player, an iPod, or an iPad. Further, the device capable of connecting to the Internet A1 can be inserted into the charging socket A' for charging. Also, a cellular phone A2 can be inserted into the charging socket A' for charging.

The connection device B has one end connected to the HDTV port A3 and the other end connected to the HDTV port C1. The device capable of connecting to the Internet (e.g., smart phone) A1 and the cellular phone A2 can communicate each other using Wifi. The display device C is implemented as a touchscreen display.

While the invention has been described in terms of preferred embodiments, those skilled in the art will recognize that the invention can be practiced with modifications within the spirit and scope of the appended claims.

What is claimed is:

1. A control system comprising, in combination:
a cloud storage comprising a plurality of corporate servers, a plurality of download sites, and a plurality of online stores;
a plurality of base stations connected to the cloud storage and connected to a control device over the Internet respectively;
the control device comprising a charging socket and a high-definition television (HDTV) port;
a display device comprising a HDTV port; and
connection means for interconnecting the control device and the display device;
wherein the charging socket is adapted to charge either a device configuring of connecting to the Internet or a cellular phone.

2. The control system of claim 1, wherein the connection means is a HDTV cable.

3. The control system of claim 1, wherein the device configuring of connecting to the Internet is a smartphone.

4. The control system of claim 3, wherein the smartphone and the cellular phone are configuring of communicating with each other using Wifi.

* * * * *